United States Patent
Kimball

(10) Patent No.: US 8,118,338 B2
(45) Date of Patent: Feb. 21, 2012

(54) APPARATUS, SYSTEM, AND METHOD FOR AUTOMOBILE PROTECTION DEVICE

(76) Inventor: Craig Kimball, Salt Lake City, UT (US)

( * ) Notice: Subject to any disclaimer, the term of this patent is extended or adjusted under 35 U.S.C. 154(b) by 0 days.

(21) Appl. No.: 12/497,449

(22) Filed: Jul. 2, 2009

(65) Prior Publication Data
US 2010/0140966 A1   Jun. 10, 2010

Related U.S. Application Data

(60) Provisional application No. 61/078,219, filed on Jul. 3, 2008.

(51) Int. Cl.
*B60R 19/42* (2006.01)
(52) U.S. Cl. .................................. 293/128; 296/207
(58) Field of Classification Search .......... 293/126–128; 296/207, 187.12
See application file for complete search history.

(56) References Cited

U.S. PATENT DOCUMENTS

| | | | |
|---|---|---|---|
| 2,611,637 A | 12/1949 | Neslund | |
| 3,147,176 A | 9/1964 | Haslam | |
| 3,288,512 A | 11/1966 | Zientara | |
| 3,472,546 A | 10/1969 | Samuels | |
| 3,582,134 A | 6/1971 | Shaff | |
| 3,659,887 A | 5/1972 | Marquette | |
| 3,882,574 A | 5/1975 | Martinez | |
| 4,002,363 A | 1/1977 | James | |
| 4,294,478 A | 10/1981 | Marquette | |
| 4,401,331 A | 8/1983 | Ziner et al. | |
| 4,498,697 A | 2/1985 | McGlone et al. | |
| 4,560,596 A | 12/1985 | Coscia | |
| 4,561,685 A * | 12/1985 | Fischer | 293/128 |
| 4,674,783 A | 6/1987 | Hogan, III | |
| 4,707,008 A | 11/1987 | Falco | |
| 4,708,380 A | 11/1987 | Cruz | |
| 4,726,614 A * | 2/1988 | Myers et al. | 293/128 |
| D299,819 S | 2/1989 | Katz et al. | |

(Continued)

FOREIGN PATENT DOCUMENTS

DE    19991047417    9/2000

(Continued)

OTHER PUBLICATIONS

Park Smart Stick-On Door Guard, http://209.85.173.104/search!q=cache:4uibXw_afrMJ:www.superiorcarcare.net/parsmarmagdo.html, retrieved on Mar. 16, 2008.

(Continued)

*Primary Examiner* — Glenn Dayoan
*Assistant Examiner* — Melissa A Black
(74) *Attorney, Agent, or Firm* — Kunzler Needham Massey & Thorpe

(57) ABSTRACT

An apparatus and a system are disclosed for protecting the side doors of an automobile when it is parked. The apparatus includes an elongated pad having two opposing ends and a central portion disposed between the two endings, and a protrusion extending from the central portion of the elongated pad and formed of a material sufficiently compressible to be shut within the door of an automobile. The system includes an elongated pad having two opposing ends and a central portion disposed between the two endings, and an adjustable protrusion extending from the central portion of the elongated pad, the adjustable protrusion movable to different locations along the length of the elongated pad, the protrusion is formed of a material sufficiently compressible to be shut within the door of an automobile.

19 Claims, 24 Drawing Sheets

U.S. PATENT DOCUMENTS

| | | | |
|---|---|---|---|
| 4,810,013 A | | 3/1989 | Spears |
| 4,810,015 A | * | 3/1989 | McNeil ........................ 293/128 |
| 4,828,302 A | | 5/1989 | Marasigan, Jr. |
| 4,871,205 A | * | 10/1989 | Bray ........................... 293/128 |
| D304,711 S | | 11/1989 | Clarke |
| 4,879,543 A | | 11/1989 | Smith, Sr. |
| D309,593 S | * | 7/1990 | Bailey ........................ D12/167 |
| D312,237 S | | 11/1990 | Avery |
| 4,991,891 A | | 2/1991 | Karshens |
| 5,060,994 A | | 10/1991 | Martin et al. |
| 5,149,166 A | | 9/1992 | Wille et al. |
| 5,162,139 A | | 11/1992 | Gomez et al. |
| 5,184,857 A | | 2/1993 | Hawkins |
| 5,267,763 A | * | 12/1993 | Klein ........................... 293/128 |
| 5,320,392 A | | 6/1994 | Hart |
| D366,637 S | | 1/1996 | Bushey |
| 5,879,037 A | * | 3/1999 | Batiste ........................ 293/118 |
| 5,975,599 A | | 11/1999 | Goldstein |
| 6,186,564 B1 | | 2/2001 | Ashcroft |
| 6,311,451 B1 | | 11/2001 | Wise |
| 6,457,755 B1 | | 10/2002 | Nieto |
| 6,719,339 B1 | | 4/2004 | Yoham |
| 6,955,383 B2 | | 10/2005 | Cano |
| 6,971,693 B1 | | 12/2005 | Richardson |
| 7,090,266 B1 | * | 8/2006 | Price ........................... 293/128 |
| 7,229,108 B2 | | 6/2007 | Hochrein |
| 7,374,214 B2 | * | 5/2008 | Debs ........................... 293/128 |
| 7,635,152 B1 | * | 12/2009 | Janus ........................... 293/126 |
| 2007/0273167 A1 | * | 11/2007 | Alexander et al. ............ 293/126 |
| 2008/0061568 A1 | * | 3/2008 | Janus ........................... 293/126 |

FOREIGN PATENT DOCUMENTS

| | | |
|---|---|---|
| JP | 05286367 | 11/1993 |
| JP | 2001097138 | 4/2001 |

OTHER PUBLICATIONS

The Genesis of DoorShield, www.doorshield.com/DoorshieldStory.aspx+removable+auto+dent +protection&hl=en&cl=cink&cd=26&gl=us, retrieved on Mar. 13, 2008.

No More Door Dings, http://www.pughandco.com/ding-bat, retrieved on Mar. 21, 2008.

Magnetic Car Door Protector, http://www.doordefender.com, retrieved on Mar. 21, 2008.

* cited by examiner

APPARATUS, SYSTEM, AND METHOD FOR AUTOMOBILE PROTECTION DEVICE

CROSS-REFERENCES TO RELATED APPLICATIONS

This application claims priority to U.S. patent application Ser. No. 61/078,219 entitled "Apparatus, System, and Method for Automobile Protection Device" and filed on Jul. 3, 2008 for Craig Kimball, which is incorporated herein by reference.

BACKGROUND

1. Field of the Invention

This invention relates to automotive exterior protection, and more particularly relates to detachable and reusable devices that protect the exterior of an automobile from side impacts from adjacently parked cars.

2. Description of the Related Art

The automobile protection devices in this field typically provide a protective buffer for side impacts for stationary automobiles. When an automobile is stationary, it can often be impacted by objects to the sides of that automobile. The sides of an automobile are most often not adequately protected by the front and rear bumpers. Contacts from other cars in a parking lot can often scar or dent the surface of the automobile or remove paint from the automobile surface. In addition to damaging the automobile aesthetically, this damage can cause permanent body damage as protective coatings are removed from the automobile surface and rusting can occur.

Certain automobiles contain built-in buffers along the side of the automobile, but these are often insufficient to protect against the impacts that the automobile receives. These built-in buffers are also often placed too high or too low on the automobile to protect the automobile body where the protection is needed. These buffers also do not extend far enough from the surface of the automobile to stop objects before those objects impact other portions of the automobile. Scratches and scars on these built-in buffers are still aesthetically damaging to the automobile as the buffer is part of the exterior of the automobile. In addition, there are many automobiles in which the styling does not include room for a built-in buffer to be places on the exterior of the automobile.

Other inventions in this field offer protection from scratches and dents, but can be difficult and clumsy to install and use. Several examples from the prior art utilize door clamps or straps which take time and effort to put in place every time the user wishes to protect his car from parking lot dents. It could be argued that even though difficult to install, the protection panels can just be left on while the car is in use. But it would ruin the aesthetic value of the car to have bulky buffer panels always attached. Other examples from the prior art offer side door buffer panels which are held in place only by industrial strength magnets. If these magnets were to slip down the car door, the door might be scratched by trapped dirt or irregularities in the magnet face.

SUMMARY

From the foregoing discussion, it should be apparent that a need exists for an apparatus, system, and method that provides protection for the sides of a stationary automobile that is both easy to use and can be quickly put into place. Beneficially, such an apparatus, system, and method would be put in place so quickly that it could become part of the driver's routine. Such an apparatus, system, and method would also be easy to adjust and easy to store when not in use.

The present invention has been developed in response to the present state of the art, and in particular, in response to the problems and needs in the art that have not yet been fully solved by currently available automotive side buffer panels. Accordingly, the present invention has been developed to provide an apparatus, system, and method for automotive side buffer panels that overcome many or all of the above-discussed shortcomings in the art.

This invention protects the sides of an automobile from damaging impacts. Furthermore, this invention is removable and is desired to avoid scratching the automobile. This invention is adjustable so that it can be placed at different heights on the automobile depending on where protection is needed. This invention is also cost-effective, and durable enough to be able to withstand weather and direct sun and cold.

The automobile protection device described in this invention is an inexpensive method of protecting the lateral portions of the automobile while it is stationary. It is made completely of a pliable, resilient, non-abrasive, and light weight material. This material could be polystyrene foam or similar, padded cloth, plain or vulcanized rubber, nylon, or some type of plastic.

In the preferred embodiment, the automobile protection device is made completely of a closed-cell foam. In another embodiment, the closed-cell foam could also be cross-linked for added strength and durability. In one embodiment, the closed-cell foam is a polyethylene. The polyethylene closed-cell foam may also be cross-linked. Both types of polyethylene are simple to manufacture and inexpensive to purchase. Polyethylene foam is rigid enough to protect the side of a car and to absorb multiple impacts, but it is also pliable and soft so as to not damage the car's exterior. This type of material ensures that the automobile protection device will not scratch the automobile body during use.

The design of this automobile protection device makes it very easy to use and to store. It is secured to the automobile by simply closing the automobile door. The automobile protection device is stored by simply folding the apparatus in half or thirds or fourths. In one embodiment, the device is manufactured in the folded position and therefore returns automatically to that position when removed from the automobile body. Under another embodiment, the device is stored by folding the apparatus manually. Unlike other examples from the prior art, the automobile protection device does not, in certain embodiments, require additional attachments to secure it to an automobile surface. Additional attachments increase the complexity and cost of the apparatus and can scratch the automobile surface. The invention may be used on any type or size of automobile. Automobiles can include any size of truck, car, boat, snowmobile, four-wheeler, semi-truck, bus or any other object that has lateral sides that may be impacted.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
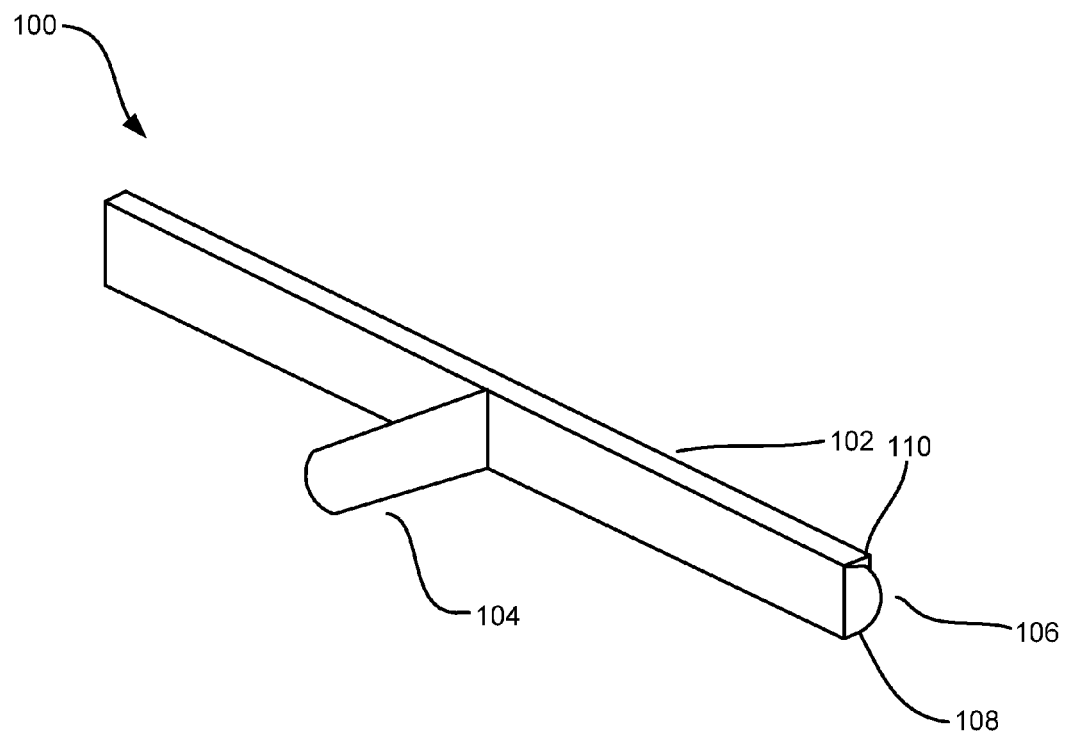
FIG. 1a is an orthogonal view of an embodiment of the automobile protection device of the present invention.
Figure 1B:
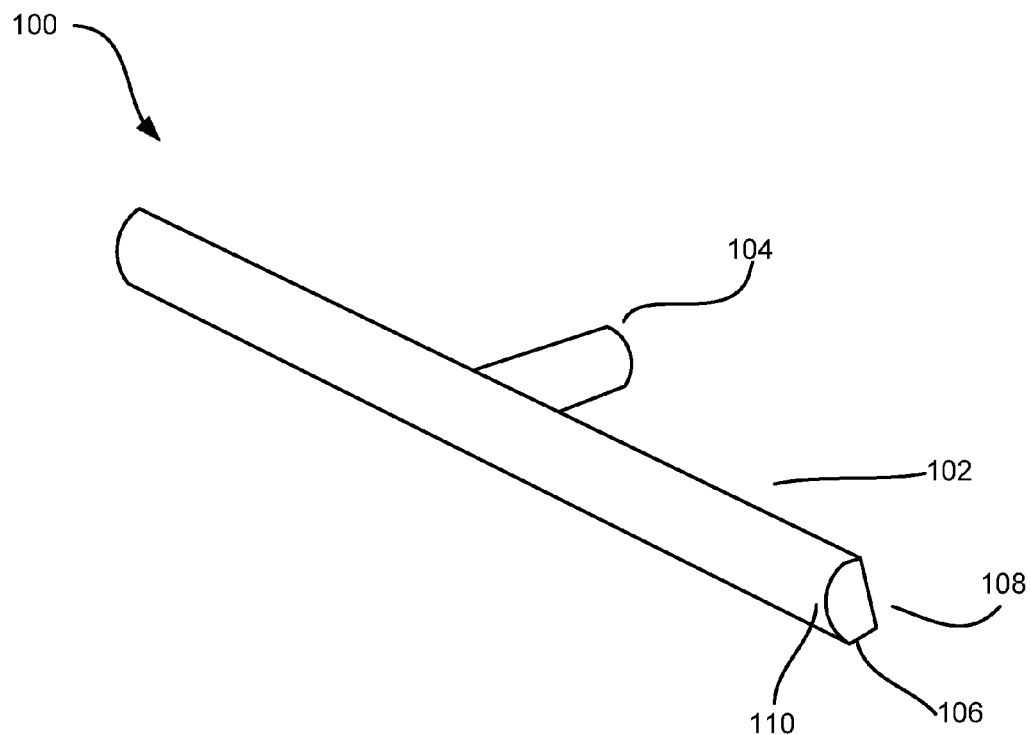
FIG. 1b is an orthogonal view of an embodiment of the automobile protection device of the present invention.

Under the embodiment of FIGS. 1a and 1b, the automobile protection device 100 consists of a compliant elongated section 102 and a compliant protrusion 104 which may extend perpendicularly from the elongated section 102. Under one embodiment, both the elongated section 102 and the protrusion 104 are made of closed-cell foam that is selected for impact absorption. The foam, in selected embodiments, is nonabrasive to the surface of the automobile, but has sufficient structural strength to withstand impacts from objects.

Under the embodiment of FIGS. 1a and 1b, the elongated section 102 has a semicircular cross section 106. The flat section 108 of the semicircular cross section 106 is designed to be placed against the automobile body. The semicircular section 110 of the semicircular cross section 106 is designed to ensure that the automobile protection device 100 will stop objects before they impact the body of the automobile. When an object impacts the compliant elongated section 102 of the elongated pad, the foam absorbs the force of the impact before it can damage the body of the automobile.

Under one embodiment, the elongated section 102 has a rectangular cross section. Under another embodiment, the rectangular cross section of the elongated section 102 has rounded edges designed to ensure that the elongated section 102 does not scar the surface of the automobile. Under one embodiment, the elongated section 102 has an oval cross section. Under another embodiment, the elongated section 102 has a circular cross section.

Under one embodiment the elongated section 102 may be up to 8 feet long, 3 inches wide, and 3 inches thick. Of course, the dimensions of the elongated section 102 may be selected to accommodate different sizes of automobile. Due to the ease of manufacturing, the elongated section 102 can be made to a plurality of lengths to accommodate different sizes of automobile, and may be customizable by the user.

Under the embodiments of FIGS. 1a and 1b, the lateral ends of the elongated section 102 are flat. Under another embodiment, the lateral ends of the elongated section 102 come to a point in a pyramid shape. Under another embodiment, the lateral ends of the elongated section 102 are rounded.

Under one embodiment, the elongated section 102 is made of a closed cell foam material. The elongated section 102 can be inexpensively manufactured in this embodiment because it is manufactured from a single material. Under one embodiment, the elongated section 102 has a soft plastic coating. The coating can be colored or printed on. The soft plastic coating ensures that the elongated section 102 does not scratch the automobile body. In one embodiment, the elongated section 102 is coated in a nylon material. Other materials that the device 100 may be formed of include polystyrene, padded cloth, normal or vulcanized rubber, nylon, plastic, or cross-linked or non cross-linked material.

Under one embodiment, the protrusion 104 extends perpendicularly from the elongated section 102 and is designed to be closed in the automobile door to hold the automobile protection device 100 in the desired location. The protrusion 104 is constructed of a material that can be compressed. Under one embodiment, the protrusion 104 is situated at the midpoint of the elongated section 102. Under another embodiment, a plurality of protrusions 104 are attached to the elongated section 102 at different locations to secure the automobile protection device 100 at different points on the automobile. Under one embodiment, the elongated section 102 and the protrusion 104 are one integral part and are made of the same material.

Under one embodiment, the protrusion 104 has an oval cross sectional shape. Under another embodiment, the protrusion 104 has a rectangular cross sectional shape. Under one embodiment, the protrusion 104 is 5 inches long, ½ inches thick and 2 inches wide.

Under the embodiment of FIGS. 1a and 1b, the protrusion 104 is attached to the elongated section 102 on one end and has a semicircular shape on the other end. Under another embodiment, the protrusion 104 has a squared end opposite the end that is attached to the elongated section 102.

Under one embodiment, there is a fillet where the protrusion 104 meets the elongated section 102. This adds strength to the attachment between the elongated section 102 and the protrusion 104. In one embodiment, the protrusion 104 is the same width as the elongated section 102 and extends perpendicularly from it. In one embodiment, the protrusion 104 is wider than the elongated section 102 to add strength to the protrusion 104 and to ensure that more material is secured to the automobile body. Under one embodiment, the protrusion 104 is completely semicircular in shape and extends from the midpoint of the elongated section 102.

Under one embodiment, the protrusion 104 is made from a compressible material that does not scratch the body of the automobile. The material is maybe a closed-cell foam material. Under one embodiment, the closed-cell foam is a polyethylene material. Under another embodiment, the closed-cell polyethylene foam may also be cross-linked for added strength. Under one embodiment, the protrusion 104 has a plastic skin material to improve the aesthetic quality of the protrusion 104 and to help ensure that it does not rip when enclosed in an automobile door. Under another embodiment, the protrusion 104 has a closed-cell foam skin designed to ensure that it does not rip when enclosed in an automobile door. Under one embodiment, an outer skin material is made from nylon or spandex and may be used to cover the protrusion 104.

Figure 2A:
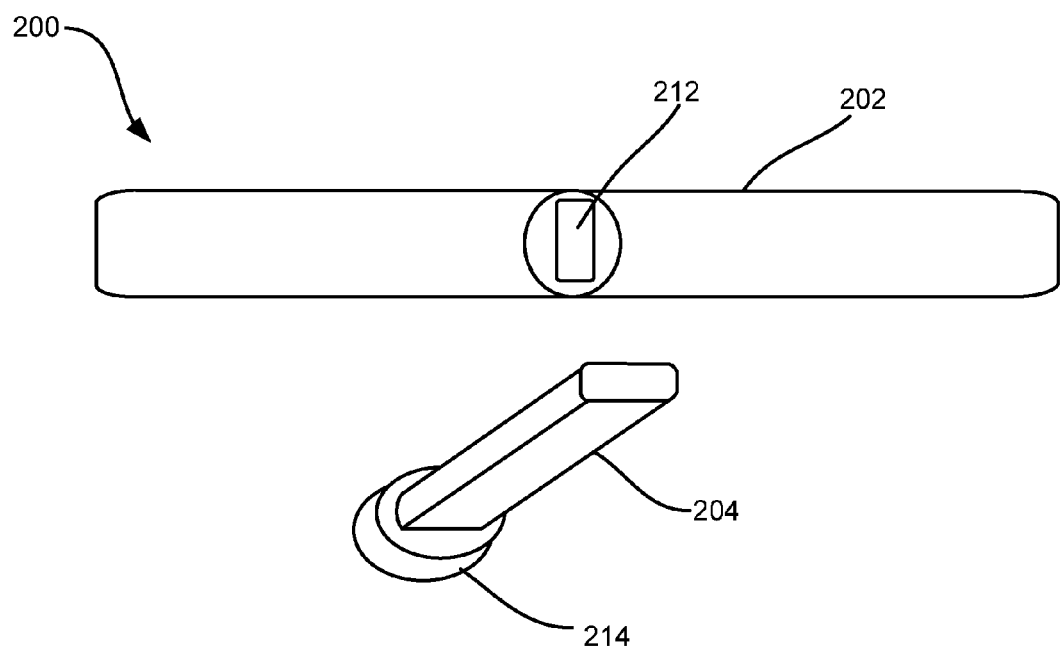
FIG. 2a is an orthogonal view of an embodiment of the automobile protection device of the present invention.

FIG. 2a shows an embodiment of the automobile protection device 200 in which the protrusion 204 is inserted into a pre-drilled hole 212 in the elongated section 202. The long thin portion of the protrusion 204 is designed to be inserted in the pre-drilled hole 212 in the elongated section 202. The protrusion 204 contains a stopper 214 configured to ensure that the protrusion 204 secures to the elongated section 202 once inserted in the pre-drilled hole 212. Under one embodiment, the protrusion 204 is held to the elongated section 202 by a raised portion on the long thin portion of the protrusion 204. The raised portion compresses while the protrusion 204 is pushed through the pre-drilled hole 212 and expands when it is through the pre-drilled hole 212. In this way, the protrusion 204 cannot easily come out of place from the elongated section 202.

Under the embodiment of FIG. 2a, the stopper 214 can be made from the same material as the protrusion 204 or it can be made from a harder, denser and more durable material to ensure that it braces against the elongated section 202. Under one embodiment, the stopper 214 and the protrusion 204 are made from the same pliable material as the elongated section to ensure that the portion of the automobile protection device 200 contains the pre-drilled hole 212 is still protected.

Under the embodiment of FIG. 2a, the stopper 214 can be made from the same material as the protrusion 204 or it can be made from a harder, denser and more durable material to ensure that it braces against the elongated section 202. Under one embodiment, the stopper 214 and the protrusion 204 are made from the same pliable material as the elongated section to ensure that the portion of the automobile protection device 200 containing the pre-drilled hole 212 is protected.

Under this embodiment, the protrusion 204 may be replaced if lost or broken, without the need to replace the elongated section 202. Also, if the protrusion 204 becomes worm after being closed in an automobile door several times, it can be replaced without replacing the elongated section 202.

Figure 2B:
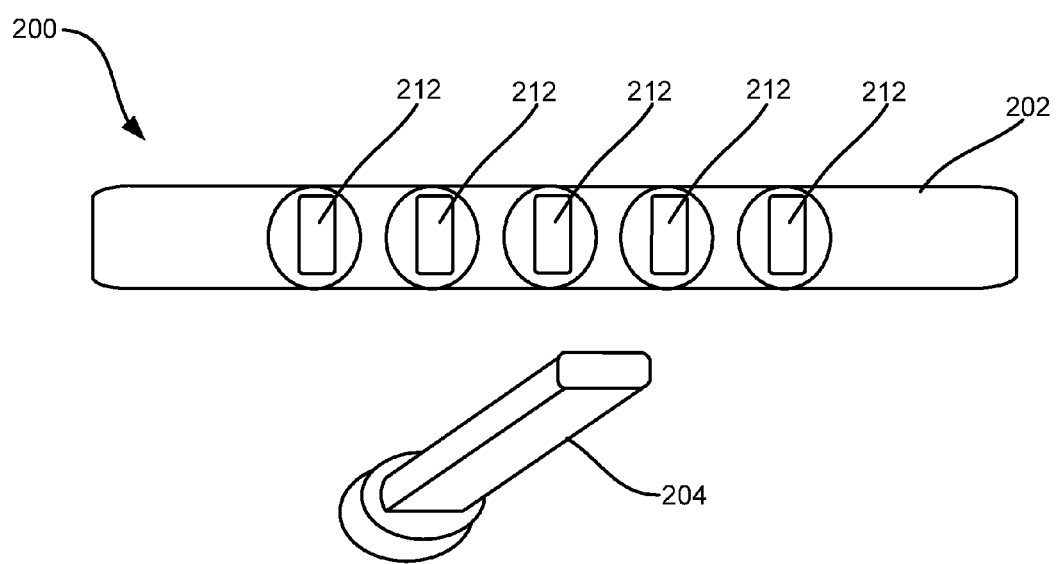
FIG. 2b is an orthogonal view of an embodiment of the automobile protection device of the present invention.

Under the embodiment of FIG. 2b, the elongated section 202 contains a plurality of pre-drilled holes 212 to accommodate the protrusion 204. The protrusion 204 may be placed in any of the pre-drilled holes 212 depending on the desired location of the protrusion 204. This allows the elongated section 202 to be placed in different horizontal position along the automobile. Also, the automobile protection device 200 can be secured to an automobile at a plurality of locations through the use of a plurality of protrusions 204 placed in the plurality of pre-drilled holes 212.

Figure 3A:
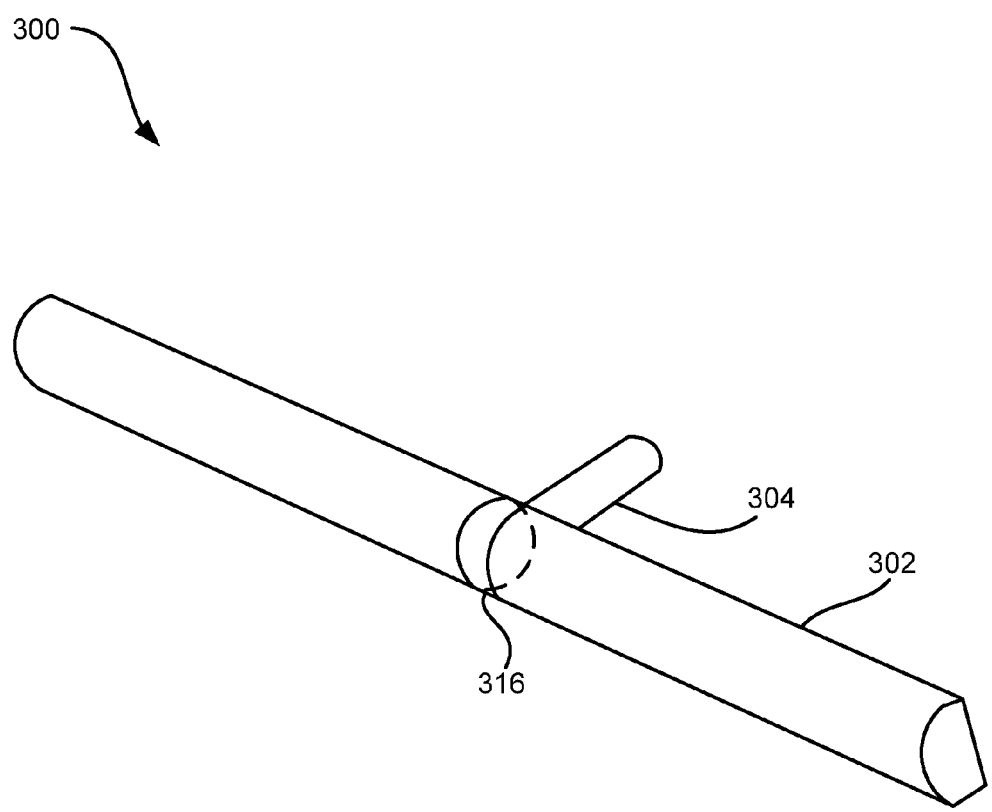
FIG. 3a is an orthogonal view of an embodiment of the automobile protection device of the present invention.
Figure 3B:
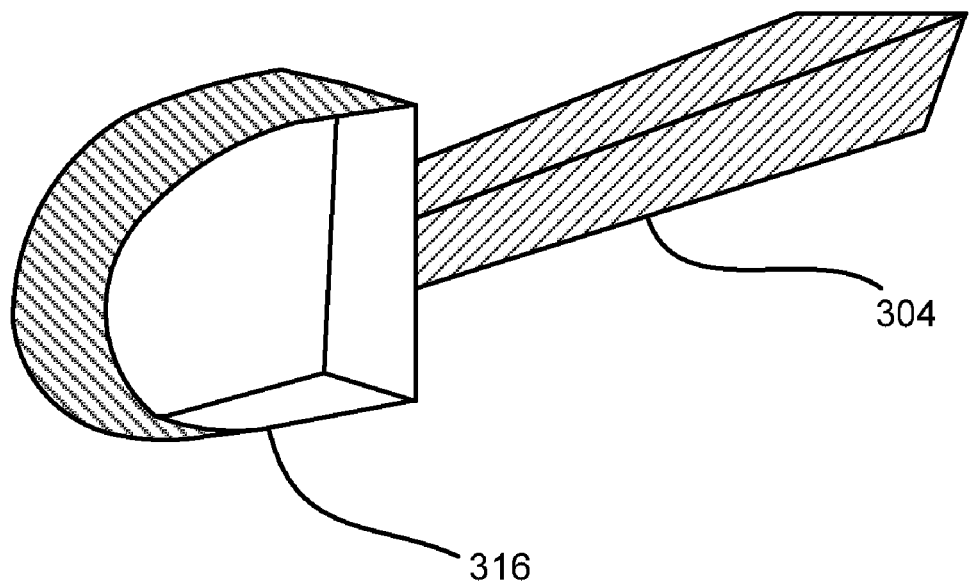
FIG. 3b is an orthogonal view of an embodiment of the protrusion with annular attachment of the present invention.

Under the embodiment of FIGS. 3a and 3b, the protrusion 304 consists of an annular shaped piece 316 connected with the protrusion 304. The annular shaped piece 316 consists of a hole shaped to fit tightly around the elongated section 302, and an outer section designed to attach to the protrusion 304 at one point. Under one embodiment, the annular shaped piece 316 is the same width as the protrusion 304. Under one embodiment, the annular shaped piece 316 is designed to give it the needed strength to prevent tearing of the material when the automobile protection device 300 is in use. Under one embodiment, the annular shaped piece 316 is a ½ inch thick. The annular shaped piece 316 is attached to the protrusion 304 through the use of an adhesive. In one embodiment, the annular shaped piece 316 is manufactured as an integral part of the protrusion 304 and is made from the same material as the protrusion 304. Under one embodiment, the area on which the protrusion 304 attaches to the annular shaped piece 316 has a filleted edge to give added strength to the connection between the protrusion 304 and the annular shaped piece 316.

The inner portion of the annular shaped piece 316 is shaped to fit tightly around the perimeter of the elongated section 302. This allows the protrusion 304 to slide along the longitudinal axis of the elongated section 302. In this way, the protection from the automobile protection device 300 can be situated in the desired position simply by moving the protrusion 304 along the elongated section 302 before closing the automobile door on the protrusion 304. This also allows the user to remove and replace the annular shaped piece 316 and the protrusion 304 without replacing the entire automobile protection device 300. These sections will likely need to be replaced before the elongated section 302, as they are designed to be closed in an automobile door.

Under the embodiment of FIGS. 3a and 3b, the protrusion 304 and the annular shaped piece 316 are constructed of a pliant material that can be closed in an automobile door. In one embodiment, the protrusion 304 and the annular shaped piece 316 are made of the same material as the elongated section 302. In one embodiment, the material is a closed-cell foam. In one embodiment, there is a plastic skin on the annular shaped piece 316 and the protrusion 304.

Figure 4:
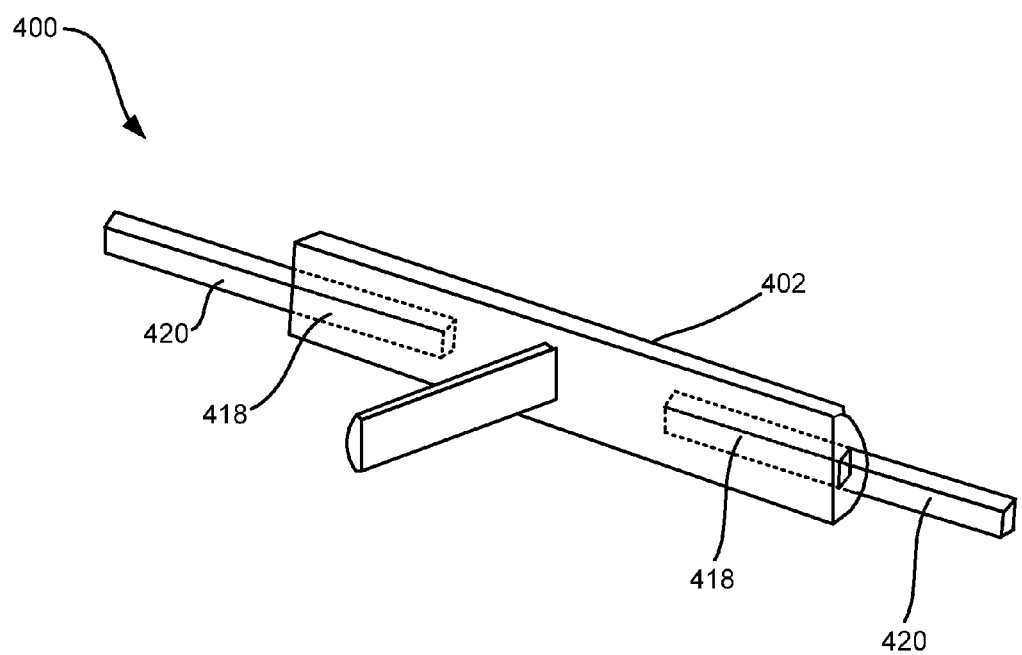
FIG. 4 is an orthogonal view of an embodiment of the automobile protection device of the present invention.

Under the embodiment of FIG. 4, the elongated section 402 contains cavities 418 wherein a second set of elongated pads 420 are placed. The cavities 418 are designed to fit tightly around the perimeter of the second set of pads 420. The perimeter of the second set of pads 420 and the cross sectional shape of the cavities 418 is similar in shape. The cavities 418 are slightly larger than the perimeter of the second set of pads 420 to ensure that the second set of pads 420 can move within the cavities 418. The cavities 418 are disposed along the longitudinal axis of the elongated section 402. The cavities 418 are disposed on the longitudinal ends of the elongated section 402 and extend toward the center of the elongated section 402. The cavities 418 do not connect to create one long cavity that extends the entire length of the elongated section 402.

Under one embodiment, the cross sectional shape of the cavities 418 and the cross sectional shape of the second set of pads 420 is rectangular. Under one embodiment, the cross sectional rectangular shape has rounded edges designed to ensure that the second set of pads do not scar the surface of the automobile. Under one embodiment, the cross sectional shape of the cavities 418 and the cross sectional shape of the second set of pads 420 is circular.

Under one embodiment, the cavities 418 are less deep than the total length of the second set of pads 420. This ensures that an end of the second set of pads 420 protrude from the lateral surfaces of the elongated section 402.

The second set of pads 420 are designed to be moved horizontally to extend the length of the elongated section 402. Under one embodiment, the second set of pads 420 contain a ridge on the end toward the interior of the elongated section 402 to ensure that the second set of pads 420 to not entirely leave the cavity 418 of the elongated section 402.

Under one embodiment, the second set of pads 420 are made of a pliable material similar to that of the elongated section 402. Under one embodiment, the second set of pads 420 are made of a material that is more stiff than the elongated section 402 to ensure that the second set of pads 420 retain their structural integrity as they extend from the end of the elongated section 402. Under one embodiment, the second set of pads 420 are covered in plastic coating.

Figure 5A:
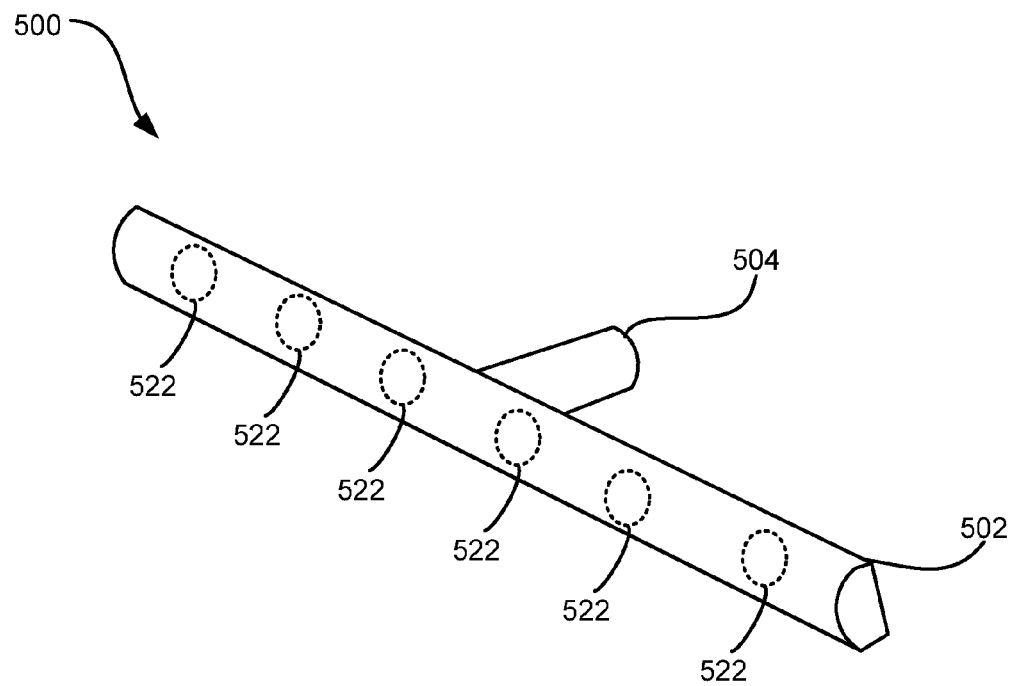
FIG. 5a is an orthogonal view of an embodiment of the automobile protection device of the present invention.
Figure 5B:
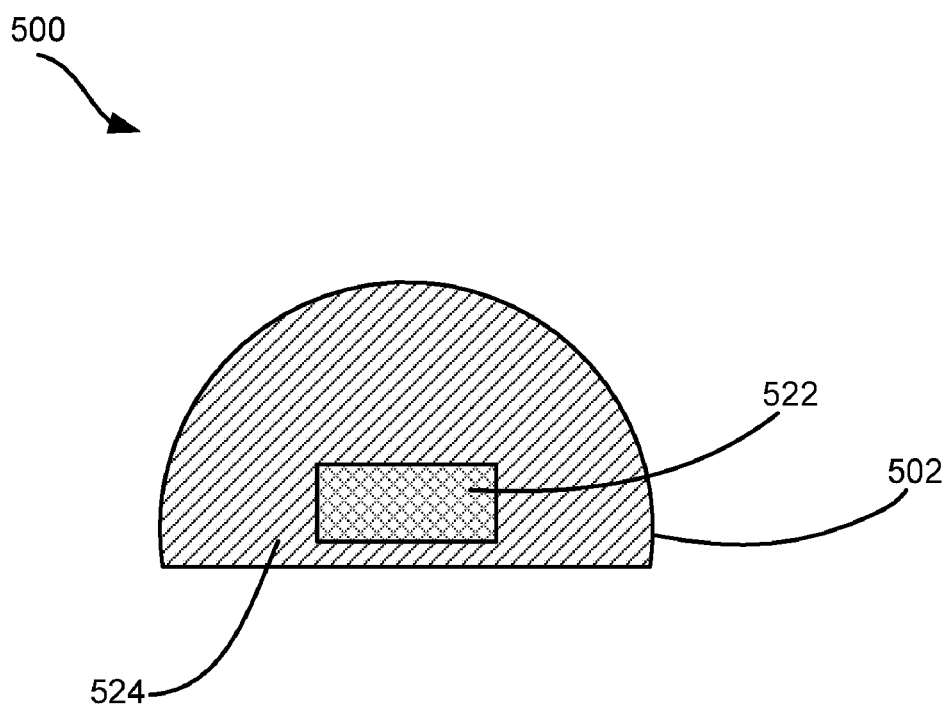
FIG. 5b is a cross sectional view of an embodiment of the elongated section of the present invention.
Figure 5C:
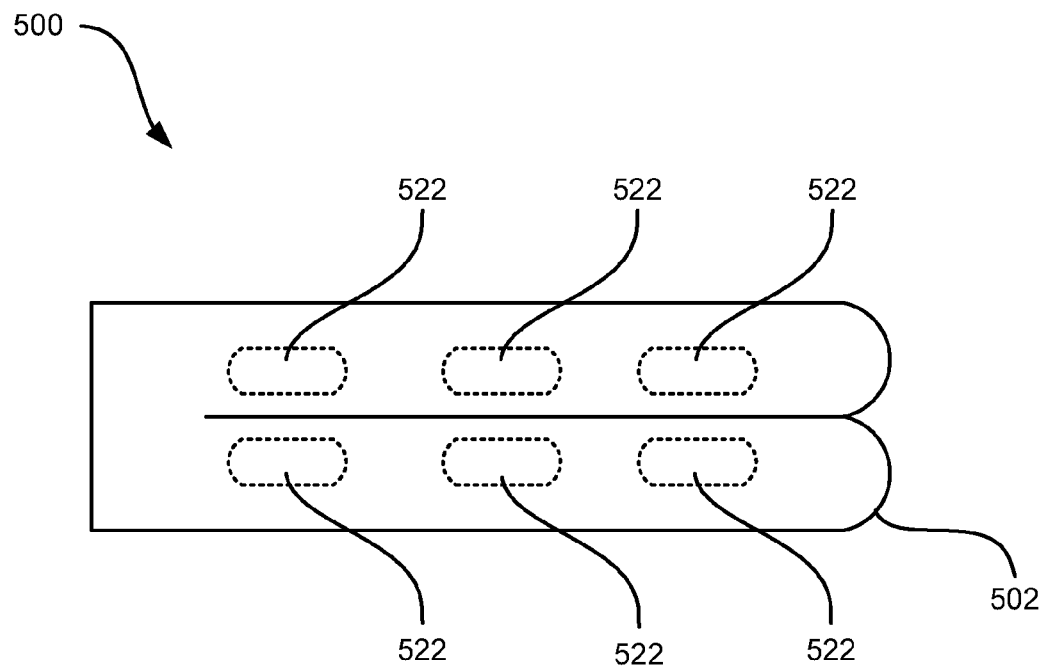
FIG. 5c is a cross sectional side view of and embodiment of the automobile protection device of the present invention.

Under the embodiment in FIGS. 5a, 5b, and 5c, a plurality of magnets 522 are imbedded in the elongated section 502. The magnets 522 are incrementally spaced throughout the elongated section 502. When the protrusion 504 is closed in the automobile door, the magnets 522 are designed to attract to the metal exterior of the automobile and further ensure that the automobile protection device 500 adheres to the exterior of the automobile body. Under the embodiment of FIG. 5b, the magnet is completely embedded in the pliable material of the elongated section 502 so that there is always a layer of foam 524 between the automobile body and the magnet surface. This ensures that the magnets 522 do not damage the surface of the automobile.

Under one embodiment, the magnets 522 have at least one flat side that is designed to face the automobile surface. Under one embodiment, the magnets 522 are rectangular. Under another embodiment, the magnets 522 are cylindrical in shape. Under one embodiment, the magnets 522 are flexible magnets. Under another embodiment, the magnets 522 are plastic coated to ensure that they do not scar the surface of the automobile. Under one embodiment, the magnets 522 are designed to be of a size and strength that will attract to the surface of the automobile and then be easily removed.

Under one embodiment, the magnets 522 are placed in the elongated section 502 during the manufacturing process. Under one embodiment, the magnets 522 are manufactured as an integral part of the elongated section 502. Under another embodiment, the magnets 522 are placed in the elongated section 502. Under another embodiment, the magnets 522 are placed in the elongated section 502 after the elongated section 502 has been manufactured. Under this embodiment, the magnets 522 can be removed by the user.

Under one embodiment, two magnets 522 are embedded in the elongated section 502 on the longitudinal ends of the elongated section 502. Under another embodiment, the magnets 522 are designed to help secure the automobile protection device 500 to the exterior of the automobile and to assist in storing the device by holding the elongated section 502 in the folded position when it is stored. When the elongated section 522 is folded for storage, the magnets 522 attract to each other and secure the elongated section 522 in the folded position.

Figure 6:
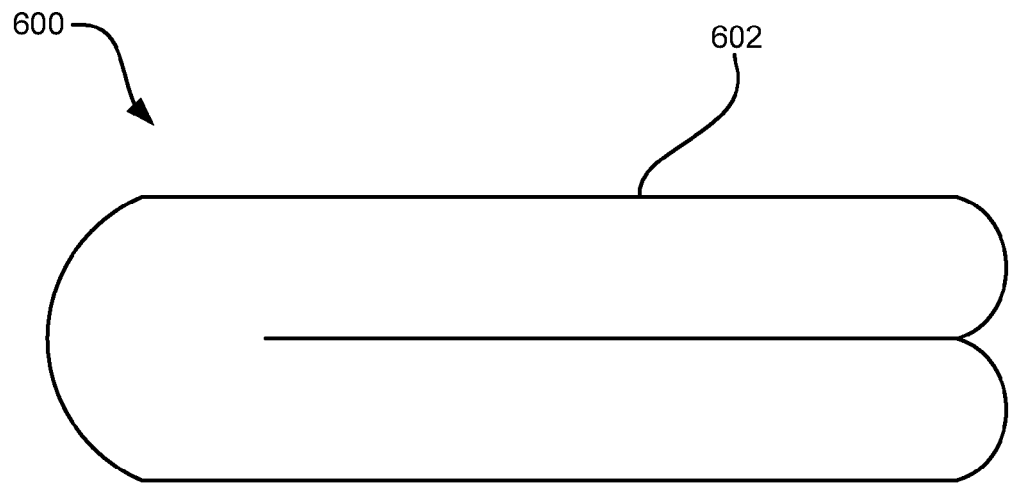
FIG. 6 is a side view of and embodiment of the automobile protection device of the present invention.

Referring now to FIG. 6, in one embodiment, the automobile protection device 600 is folded at a plurality of locations in order to store the automobile protection device 600. Under one embodiment, the automobile protection device 600 is folded in half. Under another embodiment, the automobile protection device 600 is folded in thirds. Under one embodiment, the automobile protection device 600 is folded in fourths. The automobile protection device can be folded in a plurality of manners for storage. The device 600 maybe seamed or scored.

Under the embodiment of FIG. 6, the automobile protection device 600 is folded in half for storage. The closed-cell foam material allows the elongated section 602 to fold back onto itself to save space during storage. Under one embodiment, the protrusion is on the interior of the fold of the elongated section 602.

Figure 7A:
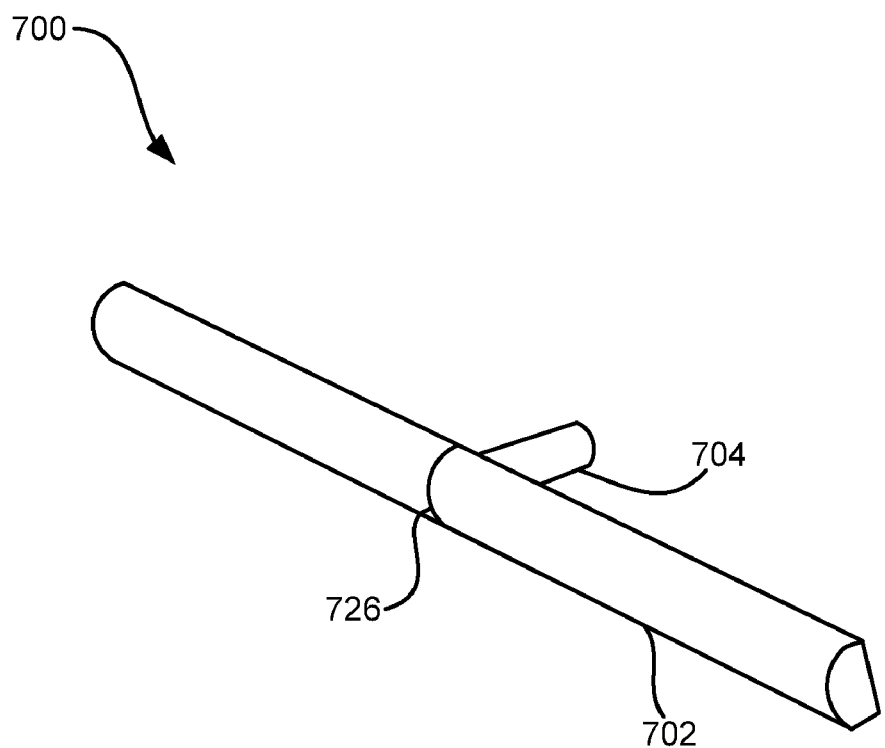
FIGS. 7a and 7b are an orthogonal view and a side view, respectively, of an embodiment of the automobile protection device of the present invention.
Figure 7B:
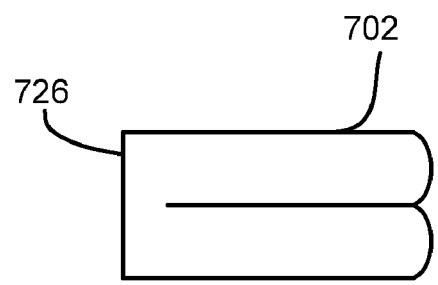

Under the embodiment of FIGS. 7a and 7b, the elongated section 702 contains a slit 726 in the center of the elongated section 702. The slit 726 is disposed through the rounded section of the cross section of the elongated section 702. In this way, sections of the elongated section 702 remain connected by the material that is not cut by the slit 726. The slit 726 allows the elongated section 702 to fold completely back on itself for storage. When the automobile protection device 700 is in use, the slit 726 does not affect its performance because the sections of the elongated section 702 separated by the slit 726 contact each other and cover the slit 726 area. In one embodiment, the slit 726 is disposed on the opposite side of the elongated section 702 from the protrusion 704.

Figure 8:
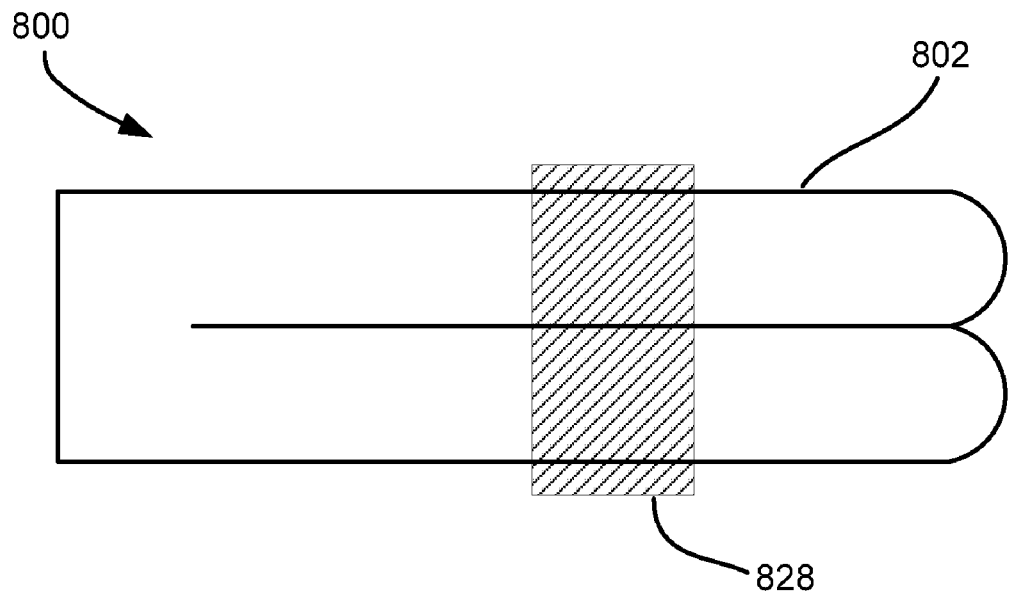
FIG. 8 is a side view of and embodiment the automobile protection device of the present invention.

Under the embodiment of FIG. 8, the elongated section 802 is held in the folded position through the use of straps 828. Under another embodiment, the straps 828 are provided by the user. The straps 828 can include rope, string, flexible, resilient cords, tape or other securing devices.

Figure 9:
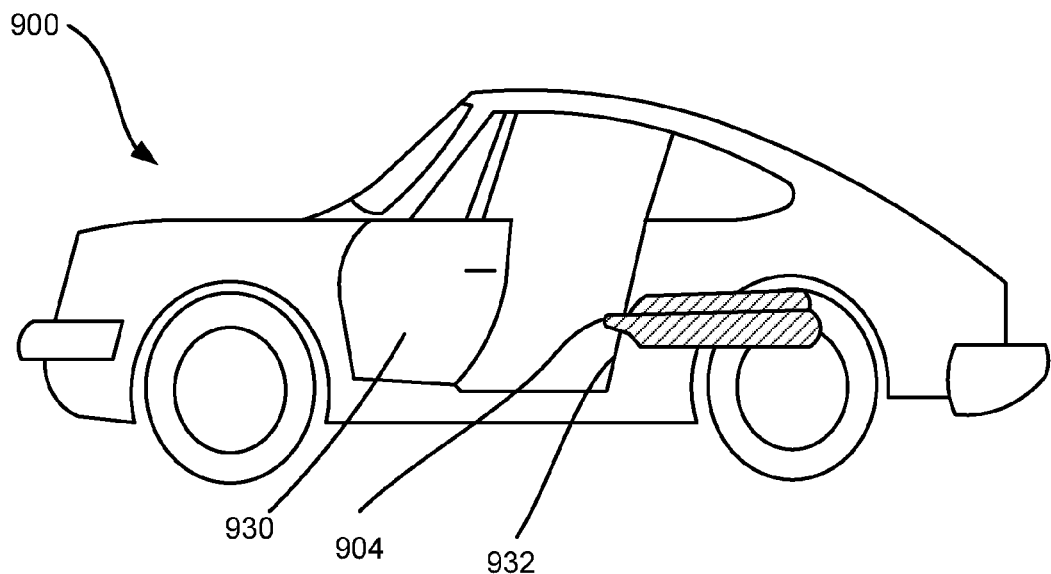
FIG. 9 is a perspective view of an embodiment of the automobile protection device of the present invention.

FIG. 9 shows the automobile protection device 900 positioned in the door jamb area 932. In one embodiment, the protrusion 904 is designed to be closed in the door jamb area 932 of an automobile. The automobile can be any type of car, truck, snowmobile, bus or other object that has lateral sides that need to be protected from contact with other objects.

Figure 10:
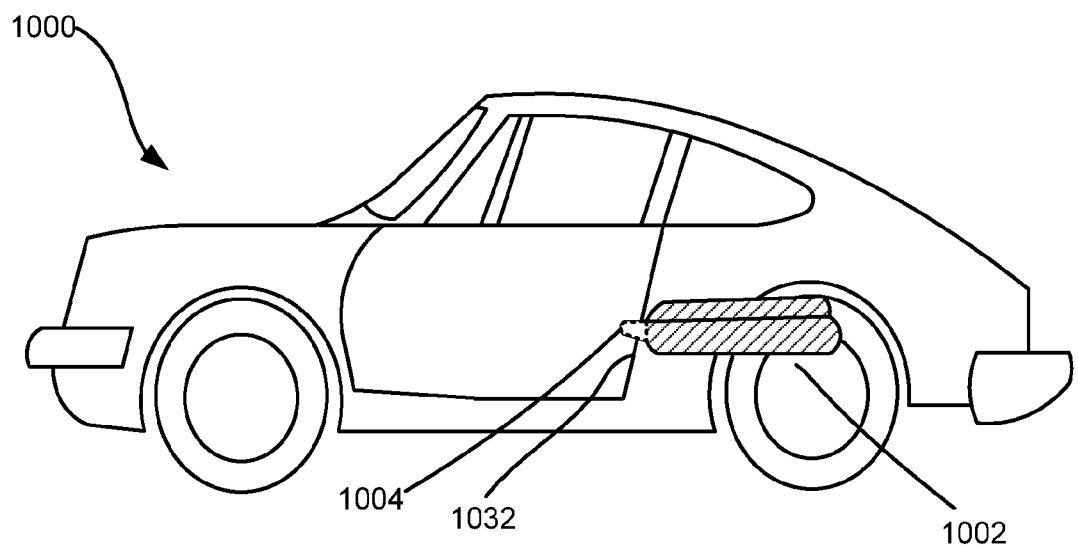
FIG. 10 is a perspective view of an embodiment of the automobile protection device of the present invention.

Under the embodiment of FIG. 10, the protrusion 1004 is designed to be caught in the door jamb area 1032. The protrusion 1004 is designed to hold the automobile protection device 1000 to the surface of the automobile. In one embodiment, the protrusion 1004 is designed to easily close in any part of the automobile door or window.

Figure 11:
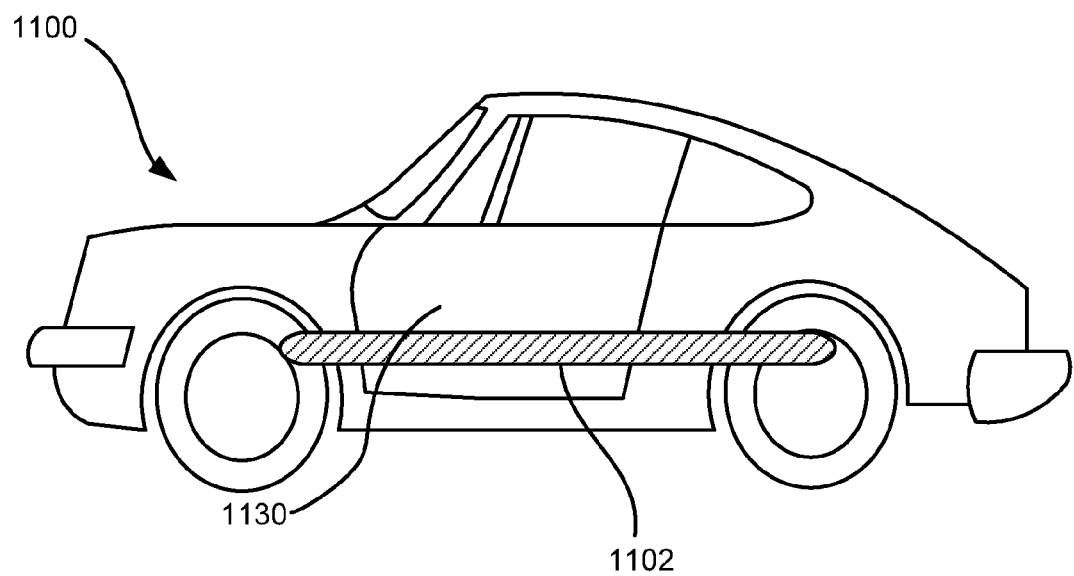
FIG. 11 is a perspective view of an embodiment of the automobile protection device of the present invention.

Under the embodiment of FIG. 11, the elongated section 1102 is designed to unfold and rest against the body of the automobile. The positioning of the automobile protection device 1100 is adjustable depending on where the protrusion (not shown in this figure) is closed in the automobile door. The automobile wheels, wheels rims, body and door can all be covered by the automobile protection device 1100.

Figure 12:
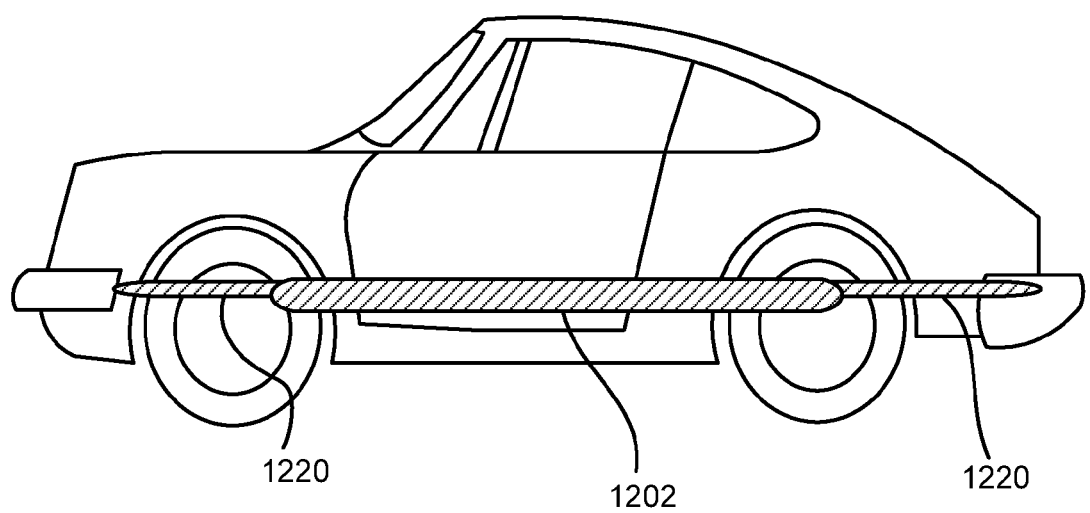
FIG. 12 is a perspective view of an embodiment of the automobile protection device of the present invention.

Under the embodiment of FIG. 12, a second set of pads 1220 are extended from the elongated section 1202. Under one embodiment, the second set of pads 1220 are half the length of the elongated section 1202.

Figure 13:
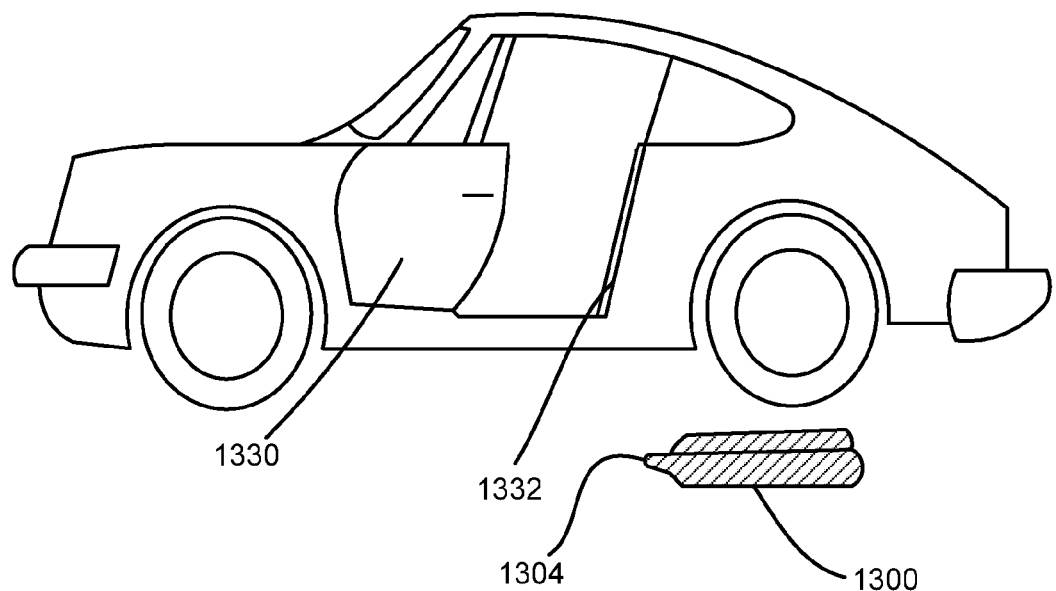
FIG. 13 is a perspective view of an embodiment of the automobile protection device of the present invention.

Under the embodiment of FIG. 13, the automobile protection device 1300 is designed to be easily removable from the automobile door 1330.

Figure 14:
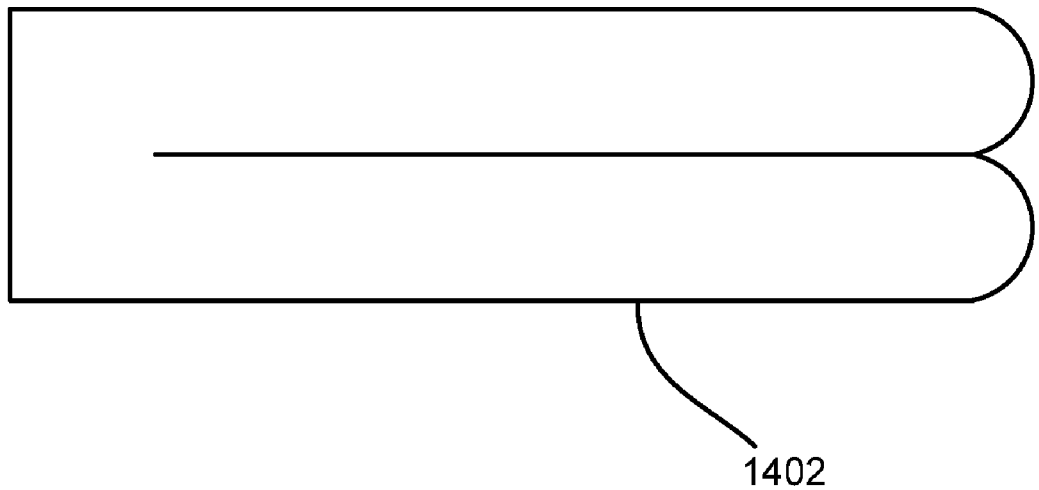
FIG. 14 is a side view of an embodiment of the automobile protection device of the present invention.

Under the embodiment of FIG. 14, the automobile protection device is configured to be folded for easy storage. The elongated section 1402 is folded in half. Because the automobile protection device is removable and does not require any modification to the automobile, it is reusable on any style or size of automobile.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 15:
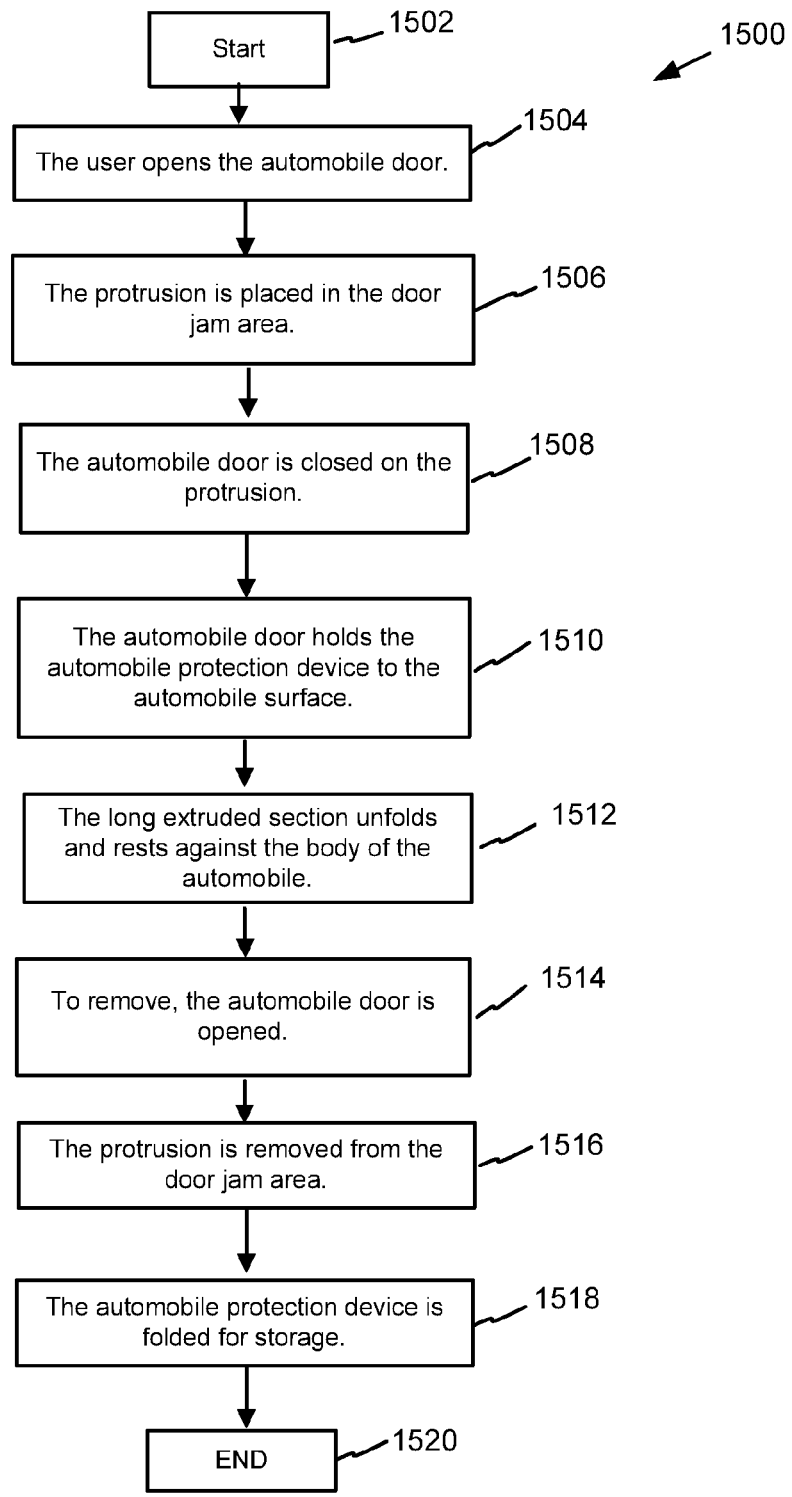
FIG. 15 is a schematic flow chart diagram illustrating one embodiment of the automobile protection device of the present invention.

FIG. 15 is a schematic flow chart diagram illustrating one embodiment of a method 1500 protecting lateral surfaces of automobiles. In one embodiment, the method 1500 starts 1502 and the user opens 1504 the automobile door 930, of FIG. 9, and places 1506 the protrusion 904 in the door jamb area 932. FIG. 9 shows that the protrusion 904 is positioned so that it will be caught in the door 930 when the door 930 is closed. The automobile door 930 is then closed 1508 on the protrusion 904. FIG. 10 shows and embodiment of the automobile protection device 1000 with the protrusion 1004 caught in the door jamb area 1032. The protrusion 1004 holds 1510 the automobile protection device 1000 to the surface of the automobile. The protrusion 404 1004 can be closed in the automobile door at different vertical positions to protect different portions of the automobile. In certain situations, the user may expect contacts at a certain vertical level and will place the automobile protection device 1000 at that level.

Once the automobile door 1130 of FIG. 11 is closed, the elongated section 1102 unfolds 1512 and rests against the body of the automobile. FIG. 11 also shows that the automobile protection device 1100 can be positioned to cover more than just the automobile door 1130. The elongated section 1102 rests horizontally on the automobile body and extends outward from the surface of the automobile body to absorb blows from surrounding objects, especially adjacent automobile doors. FIG. 12 shows an embodiment containing a second set of pads 1220. Once the elongated section 1202 unfolds and rests against the body of the automobile, the second set of pads 1220 can be extended to protect more of the automobile surface. Referring now to FIG. 13, to remove the automobile protection device 1300, the automobile door 1330 is opened 1514 and the protrusion 1304 is removed 1516 from the door jamb area 1332. The automobile protection device is folded 1518 for storage by folding the elongated section 1402 in half as shown in FIG. 14. Because the automobile protection device is removable and does not require any modification to the automobile, it is reusable on any style or size of automobile. The method 1500 then ends 1520.

Figure 16:
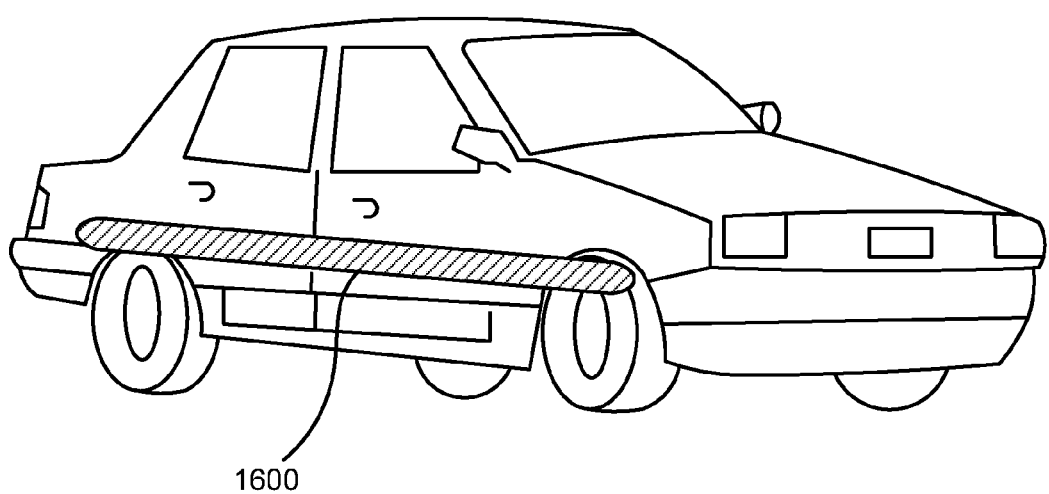
FIG. 16 is a perspective view of an embodiment of the automobile protection device of the present invention.

Under the embodiment of FIG. 16, the protection system 1600 is designed to be caught in the door jamb area of the car. In this configuration, the entire side of the car is protected from side impacts from neighboring cars.

Figure 17:
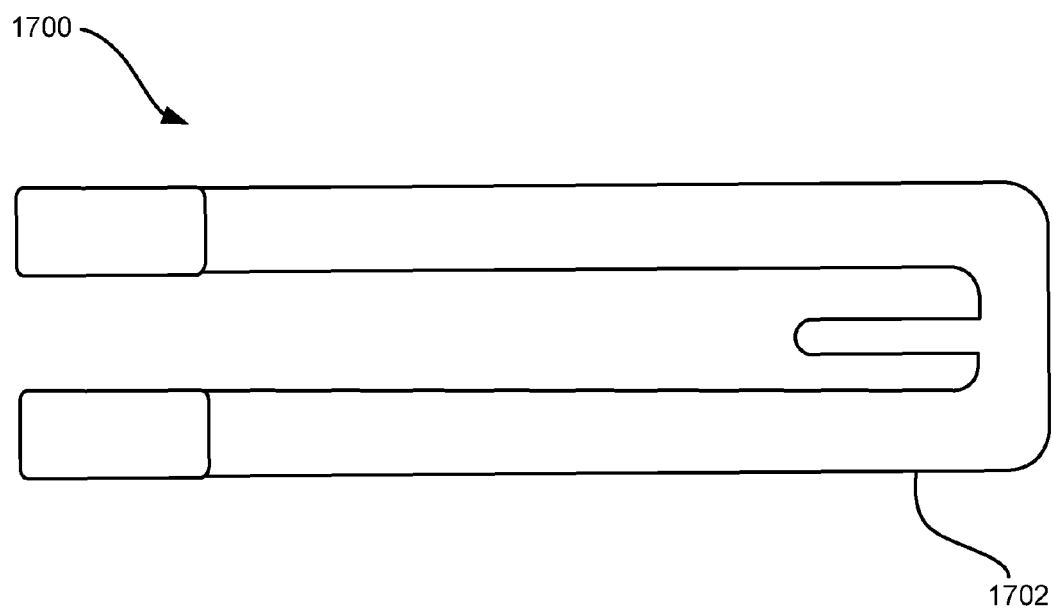
FIG. 17 is an orthogonal view of an embodiment of the automobile protection device of the present invention.

Under the embodiment of FIG. 17, the automobile protection device 1700 is manufactured in the folded position. This ensures that the natural resting position of the automobile protection device 1700 is in the folded position and creates a spring back force to return the automobile protection device 1700 to this position when removed from the surface of the automobile. The spring back force created by manufacturing the automobile protection device 1700 in the folded position also presses the elongated section 1702 against the body of the automobile when the automobile protection device 1700 is in use. Under this embodiment, the automobile protection device 1700 returns to a folded position automatically and can then be easily stored without the use of any type of fastener. The spring back force holds the folded portions of the elongated section 1702 in the folded position during storage.

Figure 18A:
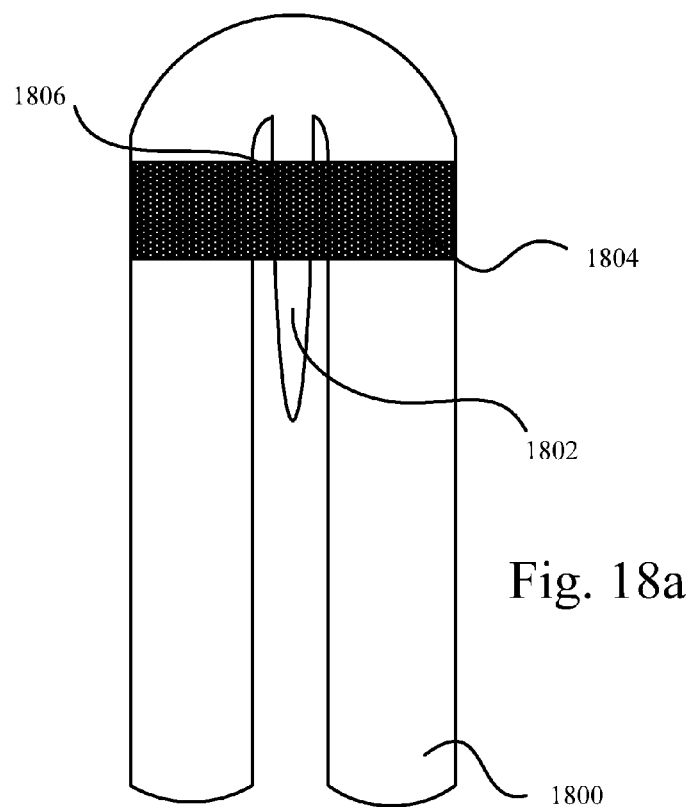
FIG. 18a is a side view of an embodiment of the automobile protection device of the present invention.
Figure 18B:
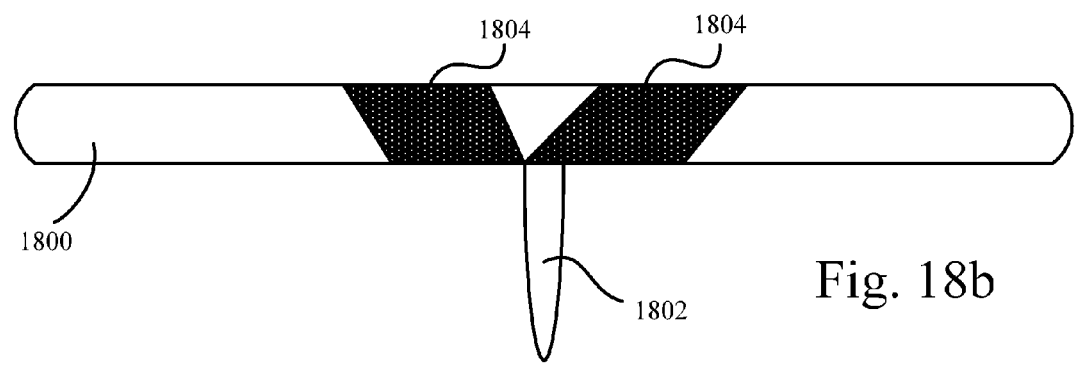
FIG. 18b is a side view of an embodiment of the automobile protection device of the present invention.

Under the embodiment of FIGS. 18a and 18b, the automobile protection device 1800 is shown with a stretchy, elastic band 1804 that can be utilized to keep the protection device 1800 in a folded position for storage. FIG. 18a shows how the protection device 1800 can be folded in half, with the protrusion 1802 held between the outer arms of the device, by an elastic band 1804 that is pulled down so as to keep the device 1800 in its folded position. FIG. 18a shows how the elastic band 1804 can be pulled back so as to allow the protection device 1800 to open up and become functional. The stretchy, elastic band has a seam 1806 stitched in place so that the band stays on the device 1800 even when the device is being used on a parked car.

Figure 19A:
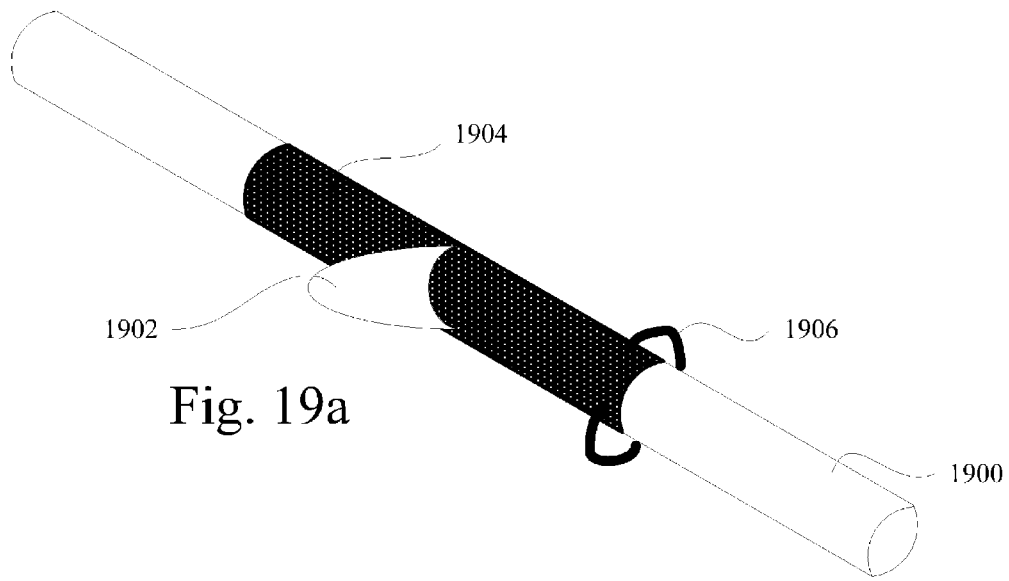
FIG. 19a is a side view of an embodiment of the automobile protection device of the present invention.
Figure 19B:
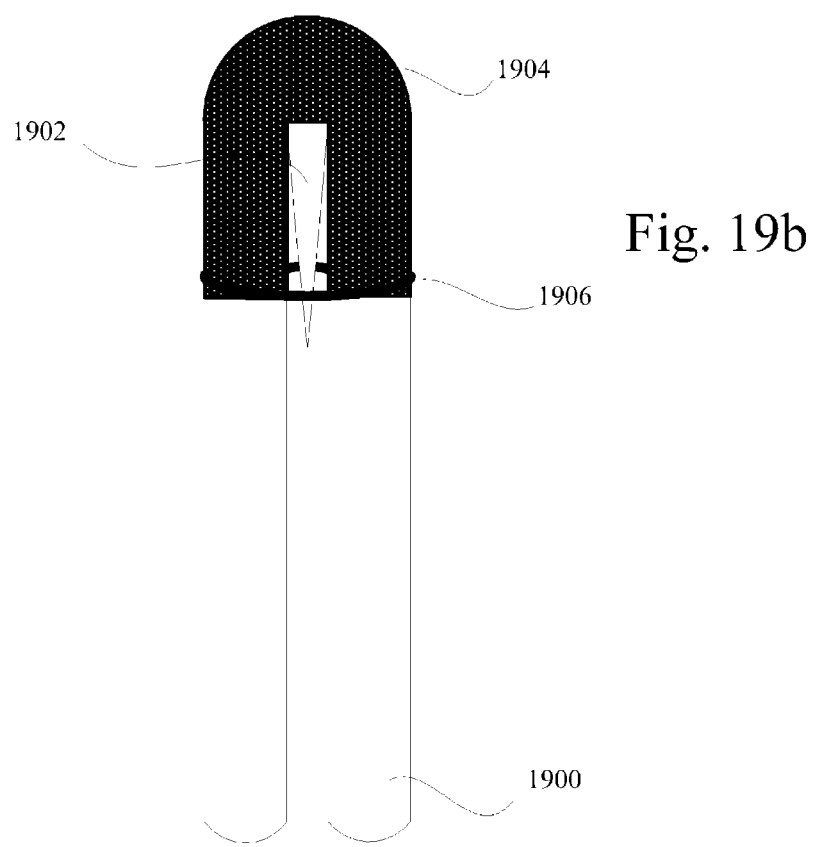
FIG. 19b is a side view of an embodiment of the automobile protection device of the present invention.

Another storage technique is shown in FIGS. 19a and 19b. In FIG. 19a, the protection device 1900 is open and ready for use. A stretchy, spandex type material is sewn into a sleeve 1904 which is put in place on the device 1900 and placed about the protrusion 1902 so that the protrusion is still able to be shut into the car door. Attached to the sleeve 1904 at one end is an elastic band 1906 which is left slack when the protection device 1900 is deployed. FIG. 19b shows how the elastic band 1906 is stretched around the protection device 1900 when it is folded in half for storage. The spandex-like sleeve 1904 keeps the elastic band 1906 from slipping off the end of the device 1900. In this configuration, folding the protection device 1900 for storage is very easy and quick.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to protect the sides of an automobile, the apparatus comprising:
    an elongated pad having two opposing ends, and a central portion disposed between the two ends;
    a protrusion having at least one opening for receiving the elongated pad such that the protrusion is slideably positionable along a length of the elongated pad; and
    wherein the protrusion extends outward from the central portion of the elongated pad, is formed of a material sufficiently compressible to be shut within the door of an automobile, and exclusively supports the two ends.

2. The resilient material of claim 1 wherein the material is weather resistant and rigid enough that can keep its shape even after sustaining multiple impacts.

3. The resilient material of claim 1 wherein the material is closed-cell polyethylene.

4. The apparatus of claim 3 wherein the elongated pad is extruded.

5. The apparatus of claim 3 wherein the elongated pad and protrusion are molded.

6. The apparatus of claim 1 wherein the elongated pad is configured to be folded in sections.

7. The apparatus of claim 6 wherein the elongated pad is manufactured to have a memory of the folded position such that when unfolded, the elongated pad hugs the side of the automobile, and then later when removed, springs back to the folded position for easy storage.

8. The apparatus of claim 6 further comprising a mechanism for keeping the elongated pad in the folded position that can include ropes, ties, elastic bands, or the like.

9. The apparatus of claim 1 further comprising a plurality of magnets arranged down the length of the elongated pad to couple the elongated pad to the surface of the automobile while the pad is unfolded, and to couple the ends of the elongated pad when it is folded.

10. The apparatus of claim 1 further comprising a spandex or elastic type band that encircles the elongated pad near the centrally located protrusion and is designed to include two loops which can be stretched down around the folded pad to secure it for storage, or can be pulled off the pad so that the pad is released into an unfolded position for use.

11. The apparatus of claim 1 further comprising a tubular, spandex sleeve that is placed around the elongated pad and includes two loops which can be stretched down around the folded pad to secure it for storage, or can be pulled off the pad so that the pad is released into an unfolded position for use.

12. The apparatus of claim 1 further comprising a tie made out of cloth, rubber, or string that is wrapped around the elongated pad when folded so as to keep the pad in its folded form during storage.

13. An apparatus to protect the sides of an automobile, the apparatus comprising:
    an elongated pad having two opposing ends and a central portion disposed between the two endings;
    a plurality of openings positioned along a length of the elongated pad; and
    an adjustable protrusion removably insertable into any of the plurality of openings, and extending from the central portion of the elongated pad, the protrusion is formed of a material sufficiently compressible to be shut within the door of an automobile.

14. The adjustable protrusion of claim 13, further comprising an annular closed cell foam attachment fixed to the protrusion, sized to fit tightly around the perimeter of the elongated pad and statically hold the protrusion to a location along the elongated pad.

15. The adjustable protrusion of claim 13, wherein the protrusion is a semi-cylinder with a widened stopping end which joins the elongated pad through a corresponding hole in the elongated pad.

16. The elongated pad of claim 13, wherein the pad contains a plurality of holes to allow for multiple placement position of the protrusion down the length of the pad.

17. An apparatus to protect the sides of an automobile, the apparatus comprising:
    an elongated pad having two opposing ends of substantially equal length, and a central portion disposed between the two ends molded out of cross-linked, closed-cell polyethylene; and
    a protrusion integrally attached to the elongated pad, the protrusion centrally located therein and formed of a material sufficiently compressible to be shut within the door of an automobile the protrusion exclusively supporting the two ends.

18. The protrusion of claim 17, wherein the protrusion is not more than twelve inches long and not more than two inches wide.

19. The apparatus of claim 17, wherein the elongated pad contains cavities at both ends of the pad, the cavities stretching partially down the long axis of the pad, and further comprising a second set of slightly smaller elongated pads, connected with the elongated pad and extendable beyond the original pad so as to create an even longer pad.

* * * * *